United States Patent [19]
Knoll et al.

[11] Patent Number: 6,031,053
[45] Date of Patent: *Feb. 29, 2000

[54] THERMOPLASTIC ELASTOMER

[75] Inventors: Konrad Knoll, Ludwigshafen; Hermann Gausepohl, Mutterstadt; Norbert Niessner, Friedelsheim; Dietmar Bender, Böhl—Iggelheim; Paul Naegele, Otterstadt, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,705

[22] PCT Filed: Jun. 8, 1995

[86] PCT No.: PCT/EP95/02207

§ 371 Date: Dec. 17, 1996

§ 102(e) Date: Dec. 17, 1996

[87] PCT Pub. No.: WO95/35335

PCT Pub. Date: Dec. 28, 1995

[30] Foreign Application Priority Data

Jun. 17, 1994 [DE] Germany ............... 44 20 952

[51] Int. Cl.$^7$ .................................. C08F 297/04
[52] U.S. Cl. ............................................. 525/314
[58] Field of Search ................. 525/3–14, 314

[56] References Cited

U.S. PATENT DOCUMENTS

| | | | |
|---|---|---|---|
| 3,507,934 | 4/1970 | Minor ...................................... | 260/876 |
| 3,639,517 | 2/1972 | Kitchen et al. ......................... | 260/879 |
| 4,054,616 | 10/1977 | Miki . | |
| 4,086,298 | 4/1978 | Fahrbach et al. ....................... | 260/880 |
| 4,089,913 | 5/1978 | Miki et al. . | |
| 4,122,134 | 10/1978 | Miki et al. . | |
| 4,152,370 | 5/1979 | Moczygemba ......................... | 525/314 |
| 4,167,545 | 9/1979 | Fahrbach et al. ....................... | 525/122 |
| 4,248,984 | 2/1981 | Bi et al. .................................. | 525/314 |
| 4,346,198 | 8/1982 | Doak et al. ............................. | 525/314 |
| 4,412,087 | 10/1983 | Trepka et al. ........................... | 585/12 |
| 4,939,208 | 7/1990 | Lanza et al. ............................ | 525/93 |
| 5,047,484 | 9/1991 | Tung ...................................... | 525/314 |
| 5,071,920 | 12/1991 | Tung ...................................... | 525/314 |
| 5,226,419 | 7/1993 | Moczygemba et al. ................ | 525/314 |
| 5,234,999 | 8/1993 | Tung et al. ............................. | 525/314 |
| 5,256,736 | 10/1993 | Trepka ................................... | 525/514 |

FOREIGN PATENT DOCUMENTS

| | | |
|---|---|---|
| 316671 | 5/1989 | European Pat. Off. . |
| 512 530 | 11/1992 | European Pat. Off. . |
| 2 138 009 | 10/1984 | United Kingdom . |

OTHER PUBLICATIONS

38 Plastics Fabr., Uses, vol. 104, 1986, Abstr. 104:111041z.
36 Plastic Manuf., vol. 83, 1975, Abstr. 194374g.
U.S. application No. 08/849,918, Niessner et al., filed Jun. 18, 1997.
Properties Guide for GE Engineering Thermoplastics p. 17; 1991.

*Primary Examiner*—David Buttner
*Attorney, Agent, or Firm*—Keil & Weinkauf

[57] ABSTRACT

An elastomeric block copolymer comprising at least one block A having polymerized units of a vinylaromatic monomer and forming a rigid phase and at least one elastomeric block B/A having polymerized units of both vinylaromatic monomers and of a diene and forming a flexible phase, and glass transition temperature Tg of the block A being above 25° C. and that of the block B/A being below 25° C. and the phase volume ratio of block A to block B/A being chosen so that the amount of the rigid phase in the total block copolymer is 1 to 40% by volume and the amount of the diene is less than 50% by weight.

12 Claims, No Drawings

THERMOPLASTIC ELASTOMER

Block copolymers of vinylaromatics (eg. styrene) and dienes (eg. butadiene) are copolymers of a plurality of polymer molecular segments (ie. blocks) which are linked to one another in series or in some other manner and have a more or less uniform composition. Depending on the structure and content of diene monomers, they may have, at a certain temperature, generally elastomeric properties or are rigid and have nonelastomeric properties, ie. they behave externally in general either as elastomeric materials, similar to a polydiene, and are important, for example, as SB rubber, or like transparent, impact-resistant styrene polymers. In line with the terminology for toughened polystyrene, it is usual to define the molecular moieties which determine the elastomeric behavior as a flexible phase and the rigid molecular moieties (the pure polystyrene component) as the rigid phase. SB rubbers cannot be processed in the same way as thermoplastics but must be vulcanized for use, in the same way as conventional diene polymers, which greatly restricts their use.

The present invention relates to usually transparent block copolymers of vinylaromatics and dienes, which copolymers can be processed by a purely thermoplastic method and have elastomeric behavior and particular mechanical properties.

In this context, the following may be said at the outset:

The anionic polymerization which leads to living polymers and in which the growth of a chain molecule takes place at a chain end which lives (remains polymerizable) for an infinitely long term in theory owing to a lack of spontaneous chain termination or chain transfer reactions, and the reaction of the living polymer with monofunctional or polyfunctional reactants, are known to provide a wide range of possibilities for the synthesis of block copolymers, although the choice of monomers is limited; only block copolymers of vinylaromatic compounds, ie. styrene and its derivatives, on the one hand, and dienes, essentially butadiene or isoprene, on the other hand, have become important in practice. Block copolymers are obtained by effecting polymerization in each case up to virtual exhaustion of a monomer stock and then changing the monomer or monomers. This process can be repeated several times.

Linear block copolymers are described, for example, in U.S. Pat. Nos. 3,507,934 and 4,122,134. Star block copolymers are disclosed, for example, in U.S. Pat. Nos. 4,086,298, 4,167,545 and 3,639,517.

The property profile of these block copolymers is characterized essentially by the content of polymerized diene monomers, ie. the length, arrangement and ratio of polydiene and polystyrene blocks. In addition, the type of transition between different blocks plays an important role: well defined and tapered transitions are known, depending on whether the change in monomer takes place abruptly or gradually. In the latter case, a more or less random distribution of sequence lengths occurs.

With identical molecular weight and diene content, block copolymers having sharply separated blocks are less tough than those having tapered block transitions. If tougher block copolymers are desired, block transitions having a random distribution of sequence lengths of diene and vinylaromatics in the transition region are consequently preferred (cf. U.S. Pat. No. 4,122,134 and EP-A-0 316 671).

In morphological investigations of block copolymers, it has been found that, in the case of tapered block transitions, the sequence length of the pure diene phase is shifted relative to the polystyrene phase and hence the volume ratio is altered in favor of the diene phase. The toughness of a polymer can thus be increased by the type of block transition without the diene content having to be increased. This may be advantageous since, with growing diene content, the flow of the melt and the heat stability of the polymers decrease and the danger of crosslinking of the diene phase increases. During processing by injection molding and extrusion, the crosslinking is evident from gel formation and turbidity in the polymer.

Achieving tapered block transitions by controlled change of the monomer addition is technically complicated and leads to a longer reaction time or lower space-time yield, which increases the production costs. In the extreme case of continuously controlled addition (cf. U.S. Pat. Nos. 4,346,198 and 4,248,984), the reaction time increases to an extreme extent owing to the unfavorable position of the copolymerization parameters for vinylaromatics and dienes, and only polymers having an inhomogeneous distribution of diene units and vinylaromatic units in the region of the block transition are obtained, which gives the effect of an increase in the number of transitions. This is evident from a low glass transition temperature ($T_g$ below −50° C., cf. U.S. Pat. No. 4,346,198, Example 1) and poor processing properties.

Particular materials having a diene content of above 35% by weight, which, owing to their property profile (toughness, transparency, gas permeability), would be suitable for medical applications, such as infusion tubes, infusion drop chambers and extending films, are very difficult to process by profile extrusion, injection molding or tubular film extrusion; even in spite of stabilization with antioxidants and free radical acceptors, they are thermally very sensitive and tend to exhibit tack, so that expensive remedies involving additives are required. The blocking (sticking of films and tubes on the roll) and difficulty of removal from the mold may make processing by injection molding completely impossible.

It is an object of the present invention to obtain, by suitable choice of the molecular structure, elastomeric block copolymers which can be produced simply on a large industrial scale, have maximum toughness in combination with a low diene content and moreover can be easily processed in the same way as thermoplastics in extruders and injection molding machines.

We have found that this object is achieved, according to the invention, generally expressed, if, in the vinylaromatic diene block copolymer comprising blocks which form a rigid phase (block type A) and those which form a flexible phase, a block B/A comprising diene and vinylaromatic units and having a random structure replaces a pure polydiene block as the flexible phase. The structure may be homogeneous or inhomogeneous as a statistical average along the chain.

The present invention relates directly to an elastomeric block copolymer comprising at least one block A which has polymerized units of a vinylaromatic monomer and forms a rigid phase and at least one elastomeric block B/A which has polymerized units of a vinylaromatic monomer and of a diene and forms a flexible phase, the glass transition temperature $T_g$ of the block A being above 25° C. and that of the block B/A being below 25° C. and the phase volume ratio of block A to block B/A being chosen so that the amount of the rigid phase in the total block copolymer is from to 40% by volume and the amount of the diene in the total block copolymer is less than 50% by weight.

Such a novel elastomeric block copolymer is obtained if, within the above parameters, the flexible phase is formed from a random copolymer of a vinylaromatic with a diene; random copolymers of vinylaromatics and dienes are obtained by polymerization in the presence of a polar cosolvent.

A novel block copolymer may be of, for example, one of the general formulae 1 to 11:

$$(A-B/A)n; \quad (1)$$

$$(A-B/A)n-A; \quad (2)$$

$$B/A(A-B/A)n; \quad (3)$$

$$X-[(A-B/A)n]m+1; \quad (4)$$

$$X-[(B/A-A)n]m+1; \quad (5)$$

$$X-[(A-B/A)n-A]m+1; \quad (6)$$

$$X-[(B/A-A)n-B/A]m+1; \quad (7)$$

$$Y-[(A-B/A)n]m+1; \quad (8)$$

$$Y-[(B/A-A)n]m+1; \quad (9)$$

$$Y-[(A-B/A)n-A]m+1; \quad (10)$$

$$Y-[(B/A-A)n-B/A]m \ 1; \quad (11)$$

where A is the vinylaromatic block and B/A is the flexible phase, ie. the block composed of random diene and vinylaromatic units, X is a radical of an n-functional initiator, Y is the radical of a m-funotional coupling agent and m and n are natural numbers from 1 to 10.

A preferred block copolymer is one of the general formula A-B/A-A, X-[-B/A-A]2 or Y-[-B/A-A]2 (the meanings of the abbreviations are as above) and a particularly preferred block copolymer is one whose flexible phase is divided into blocks $$(B/A)_1-(B/A)_2; \quad (12)$$

$$(B/A)_1-(B/A)_2-(B/A)_1; \quad (13)$$

$$(B/A)_1-(B/A)_2-(B/A)_3; \quad (14)$$

whose vinylaromatic/diene ratio differs in the individual blocks B/A or changes continuously within a block within the limits $(B/A)_1 \rightarrow (B/A)_2$, the glass transition temperature $T_g$ of each sub-block being below 25° C.

A block copolymer which has a plurality of blocks B/A and/or A having different molecular weights per molecule is likewise preferred.

A particularly preferred combination of monomers is butadiene and styrene. All weights and volumes stated below are based on this combination; when technical equivalents of styrene and butadiene are used, the data will have to be correspondingly converted.

The B/A block is composed of about 75–30% by weight of styrene and 25–70% by weight of butadiene. A flexible block particularly preferably has a butadiene content of from 35 to 70% and a styrene content of from 65 to 30%.

In the case of the monomer combination styrene/butadiene, the amount of the diene in the total block copolymer is 15–65% by weight and that of the vinylaromatic component is correspondingly 85–35% by weight. Butadiene/styrene block copolymers having a monomer composition comprising 25–60% by weight of diene and 75–40% by weight of vinylaromatic compound are particularly preferred.

According to the invention, the block copolymers are prepared by anionic polymerization in a nonpolar solvent with the addition of a polar cosolvent. The concept here is that the cosolvent acts as a Lewis base toward the metal cation. Preferably used solvents are aliphatic hydrocarbons, such as cyclohexane or methylcyclohexane. Polar aprotic compounds, such as ethers and tertiary amines, are preferred as Lewis bases. Examples of particularly effective ethers are tetrahydrofuran and aliphatic polyethers, such as diethylene glycol dimethyl ether. Examples of tertiary amines are tributylamine and pyridine. The polar cosolvent is added to the nonpolar solvent in a small amount, for example 0.5–5% by volume- Tetrahydrofuran in an amount of 0.1–0.3% by volume is particularly preferred. Experience has shown that an amount of about 0.2% by volume is sufficient in most cases.

The copolymerization parameters and the amount of 1,2- and 1,4-bonds of the diene units are determined by the metering and structure of the Lewis base. The novel polymers contain, for example, 15–40% of 1,2-bonds and 85–60% of 1,4-bonds, based on all diene units.

The anionic polymerization is initiated by means of organometallic compounds. Compounds of the alkali metals, particularly lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The amount metered depends on the desired molecular weight of the polymer but is as a rule from 0.002 to 5 mol %, based on the monomers.

The polymerization temperature may be from 0 to 130° C., preferably from 30 to 100° C.

The amount by volume of the flexible phase in the solid is of decisive importance for the mechanical properties. According to the invention, the amount by volume of the flexible phase composed of diene and vinylaromatic sequences is 60–95, preferably 70–90, particularly preferably 80–90, % by volume. The blocks A formed from the vinylaromatic monomers constitute the rigid phase, which accounts for 5–40, preferably 10–30, particularly preferably 10–20, % by volume.

It should be pointed out that there is no strict correlation between the abovementioned ratios of vinylaromatic compound and diene, the abovementioned limits of the phase volumes and the composition which arises from the novel ranges of the glass transition temperature, since the relevant numbers in each case are numerical values rounded up to the nearest tens unit. Any correlation is likely to be merely accidental.

The volume fraction of the two phases can be measured by means of high-contrast electron microscopy or solid-state NMR spectroscopy. The amount of vinylaromatic blocks can be determined by precipitation and weighing following osmium degradation of the polydiene content. The future phase ratio of a polymer can also be calculated from the amounts of monomers used if polymerization is taken to completion every time.

In addition, it is to be pointed out (cf. J. Brandrup, E. H. Immergut, Polymer Handbook, John Wiley, N.Y.) that the densities of styrene/butadiene copolymers can be calculated approximately from the mass fractions of the monomers; thus, the density of polybutadiene (obtained by anionic polymerization) is 0.895 g/ml and the density of polystyrene is about 1.05 g/ml (mean value), whereas the density is stated as 0.933 for a styrene/butadiene copolymer (SB rubber) containing 23.5% of styrene. The calculated density would be 0.960.

In addition, it is to be pointed out (cf. J. Brandrup, E. H. Immergut, Polymer Handbook, John Wiley, N.Y.) that the densities of styrene/butadiene copolymers can be calculated approximately from the mass fractions of the monomers; thus, the density of polybutadiene (obtained by anionic polymerization) is 0.895 g/ml and the density of polystyrene is about 1.05 g/ml (mean value), whereas the density is stated as 0.933 for a styrene/butadiene copolymer (SB rubber) containing 23.5% of styrene. The calculated density would be 0.960.

For the purposes of the present invention, the block copolymer is unambiguously defined by the quotient of the volume fraction as a percentage of the flexible phase formed from the B/A blocks and the fraction of diene units in the flexible phase, which is from 25 to 70% by weight for the combination styrene/butadiene.

The glass transition temperature ($T_g$) is influenced by the random incorporation of the vinylaromatic compounds in the flexible block of the block copolymer and the use of Lewis bases during the polymerization. A glass transition temperature of from −50 to +25° C., preferably from −50 to +5° C. is typical.

The molecular weight of block A is in general from 1000 to 200,000, preferably from 3000 to 80,000, g/mol. Within a molecule, A blocks may have different molecular weights.

The molecular weight of block B/A is usually from 2000 to 250,000, preferably from 5000 to 150,000, g/mol.

As in the case of block A, block B/A too may assume different molecular weight values within a molecule.

The coupling center X is formed by the reaction of the living anionic chain ends with a bifunctional or polyfunctional coupling agent. Examples of such compounds are given in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Dichlorodialkylsilanes, dialdehydes, such as terephthalaldehyde, and esters, such as ethyl formate or ethyl benzoate, are particularly suitable for the dimerization.

Preferred polymer structures are A-B/A-A, X-[-B/A-A]$_2$ and Y-[-B/A-A]$_2$, where the random block B/A itself may in turn be divided into blocks B1/A1-B2/A2-B3/A3- . . . . The random block preferably consists of from 2 to 15, particularly preferably from 3 to 10, random subblocks. The division of the random block B/A into as many subblocks Bn/An as possible has the decisive advantage that the B/A block as a whole behaves like a virtually perfect random polymer even in the case of a composition gradient within a subblock Bn/An, which is difficult to avoid in the anionic polymerization under practical conditions (see below). It is therefore appropriate to add less than the theoretical amount of Lewis base, which increases the proportion of 1,4-diene bonds, reduces the glass transition temperature $T_g$ and decreases the susceptibility of the polymer to crosslinking. A larger or a smaller amount of subblocks may be provided with a high diene content. As a result of this, the polymer retains a residual toughness even below the glass transition temperature of the predominant B/A blocks and does not become completely brittle.

The novel block copolymers have a property spectrum very similar to that of flexible PVC but can be prepared completely free of low molecular weight plasticizers capable of migrating. They have a high oxygen permeation $P_o$ and water vapor permeation $P_w$ of more than 2000 [cm$^3$·100 μm/m$^2$·d·bar] and above 10 [g 100 μm/m$^2$.d.bar], respectively, $P_o$ indicating the amount of oxygen in cm$^3$, and $P_w$ the amount of water vapor in grams, which passes through 1 m$^2$ of film having a standard thickness of 100 μm per day and per bar partial pressure difference.

A high restoring force on deformation, as observed in the case of thermoplastic elastomers, high transparency (above 90% at 10 μm layer thickness), a low welding temperature of less than 120° C. and a broad welding range (more than 5° C.) in combination with moderate tack make the novel block copolymers a suitable starting material for the production of stretch films, infusion tubes and other extruded, injection molded, thermoformed or blow-molded finished articles for which high transparency and toughness are required, in particular for applications in medical technology.

The polymerization is carried out in a plurality of stages and, in the case of monofunctional initiation, is begun, for example, with the preparation of the rigid block A. A part of the monomers is initially taken in the reactor and the polymerization is initiated by adding the initiator. In order to achieve a defined chain structure which can be calculated from the monomer and initiator dose, it is advisable to continue the process to a high conversion (above 99%) before the second monomer addition. However, this is not absolutely essential.

The sequence of the monomer addition depends on the chosen block structure. In the case of monofunctional initiation, for example, the vinylaromatic compound is first either initially taken or directly metered in. Thereafter, diene and vinylaromatic should be added as far as possible simultaneously. The random structure and the composition of the block B/A are determined by the ratio of diene to vinylaromatic compound, the concentration and the chemical structure of the Lewis base and the temperature. According to the invention, the diene accounts for from 50% by weight relative to the total material, including vinylaromatic compound. Block A can then be polymerized by adding the vinyl-aromatic compound. Instead, required polymer blocks may also be bonded to one another by a coupling reaction. In the case of bifunctional initiation, the B/A block is first synthesized, followed by the A block.

The further working up is carried out by the conventional methods. It is advisable to employ a stirred kettle and to protonate the carbanions with an alcohol, such as isopropanol, to render the mixture weakly acidic in the usual manner with $CO_2$/water before the further working up, to stabilize the polymer with an antioxidant and a free radical acceptor (commercial products, such as trisnonylphenyl phosphite (TNPP) or α-tocopherol (vitamin E), or products obtainable under the trade names Irganox 1076 or Irganox 3052), to remove the solvent by the usual methods, and to carry out extrusion and granulation. As in the case of other rubber types, the granules can be prevented from sticking together by means of an antiblocking agent, such as Acrawax®, Besquare® or Aerosil®.

EXAMPLES

For each Example, a simultaneously heatable and coolable 50 l stainless steel autoclave equipped with a cross-blade agitator was prepared by flushing with nitrogen, cleaning by boiling a solution of sec-butyllithium and 1,1-diphenylethylene (molar ratio 1:1) in cyclohexane and drying.

22.8 l of cyclohexane were then introduced in each case and the amounts of initiator, tetrahydrofuran and monomers shown in Table 1 were added. The polymerization time and the initial and final temperature are also stated, and it should be pointed out that the monomer feed time was always short compared with the polymerization time.

The temperature of the reaction mixture was controlled by heating or cooling the reactor jacket. After the end of the reaction (consumption of the monomers), the mixture was titrated with ethanol in Examples 1–10, with ethyl formate in Example 11 and with epoxidized linseed oil in Example 12 until the color vanished or, in Examples 11 and 12, until the color changed to light yellow, and the mixture was rendered acidic with a 1.5-fold excess of formic acid. Finally, 34 g of a commercial stabilizer (Irganox® 3052 from Ciba-Geigy, Basle) and 82 g of trisnonylphenyl phosphite were added.

The solution was worked up in a devolatilization extruder (three domes, forward and backward devolatilization) at 200° C. and the product was granulated. 10 g of Acrawax® were added to the granules as an external lubricant in a fluid mixer.

TABLE 1

Polymerization and analysis of linear S-SB-S block copolymers and of a star block copolymer (Example 12)

|  | Example 1 | Example 2 | Example 3 | Example 4 | Example 5 | Example 6 |
|---|---|---|---|---|---|---|
| THF (ml) | 65.8 | 65.8 | 65.8 | 65.8 | 65.8 | 45.6 |
| s-BuLi (ml) | 42 | 42 | 42 | 42 | 42 | 42 |
| Styrene 1 (g) | 1008 | 1008 | 1008 | 1008 | 1008 | 1008 |
| T(B)/T(E) (° C.) | 30/70 | 30/70 | 30/77 | 30/70 | 30/70 | 30/70 |
| Time (min) | 30 | 30 | 12 | 30 | 30 | 30 |
| Butadiene 1 (g) | 1120 | 1120 | 1120 | 1120 | 1120 | 1120 |
| Styrene 2 (g) | 1412 | 1412 | 1412 | 1412 | 1412 | 1412 |
| T(B)/T(E) (° C.) | 56/73 | 68/96 | 77/102 | 68/96 | 68/96 | 68/96 |
| Time (min) | 19 | 17 | 14 | 17 | 17 | 17 |
| Butadiene 2 (g) | 1120 | 1120 | 1120 | 1120 | 1120 | 1120 |
| Styrene 3 (g) | 1412 | 1412 | 1412 | 1412 | 1412 | 1412 |
| T(B)/T(E) (° C.) | 52/76 | 60/84 | 73/95 | 60/84 | 60/84 | 60/84 |
| Time (min) | 22 | 12 | 10 | 12 | 12 | 12 |
| Butadiene 3 (g) | 1120 | 1120 | 1120 | 1120 | 1120 | 1120 |
| Styrene 4 (g) | 1412 | 1412 | 1412 | 1412 | 1412 | 1412 |
| T(B)/T(E) (° C.) | 54/73 | 64/83 | 74/88 | 64/83 | 64/83 | 64/83 |
| Time (min) | 19 | 6 | 26 | 6 | 6 | 6 |
| Styrene 5 (g) | 1008 | 1008 | 1008 | 1008 | 1008 | 1008 |
| T(B)/T(E) (° C.) | 60/64 | 70/76 | 74/85 | 70/76 | 70/76 | 70/76 |
| Time (min) | 45 | 14 | 14 | 14 | 14 | 14 |
| Mn (g/mol) | 117 000 | 118 000 | 119 000 | 79 000 | 107 000 | 119 000 |
| Mp (g/mol) | 153 000 | 156 000 | 158 000 | 92 000 | 141 000 | 158 000 |
| Mw (g/mol) | 172 000 | 176 000 | 180 000 | 100 000 | 159 000 | 177 000 |
| Tg (° C.) | −10/75 | −13/75 | −16/75 | −10/70 | −12/72 | −15/75 |
| Range (° C.) | 12/15 | 10/13 | 9/12 | 11/20 | 11/15 | 13/15 |
| MVI | 9.2 | 9.0 | 8.5 | 60 | 21 | 8.6 |

|  | Example 7 | Example 8 | Example 9 | Example 10 | Example 11 | Example 12 |
|---|---|---|---|---|---|---|
| THF (ml) | 65.8 | 65.8 | 65.8 | 65.8 | 65.8 | 65.8 |
| s-BuLi (ml) | 42 | 42 | 42 | 42 | 84 | 126 |
| Styrene 1 (g) | 756 | 1008 | 1008 | 1008 | 2016 | 2520 |
| T(B)/T(E) (° C.) | 30/68 | 30/70 | 30/70 | 30/70 | 30/76 | 30/72 |
| Time (min) | 30 | 30 | 30 | 30 | 30 | 30 |
| Butadiene 1 (g) | 1194 | 1120 | 1120 | 1120 | 1120 | 1120 |
| Styrene 2 (g) | 1506 | 1412 | 1412 | 1519 | 1412 | 1412 |
| T(B)/T(E) (° C.) | 66/96 | 68/96 | 68/96 | 70/96 | 68/96 | 68/96 |
| Time (min) | 18 | 17 | 17 | 17 | 17 | 17 |
| Butadiene 2 (g) | 1194 | 1772 | 2532 | 1334 | 1120 | 1120 |
| Styrene 3 (g) | 1506 | 760 | — | 1198 | 1412 | 1412 |
| T(B)/T(E) (° C.) | 58/84 | 60/89 | 60/94 | 60/86 | 60/84 | 60/84 |
| Time (min) | 13 | 16 | 20 | 13 | 12 | 12 |
| Butadiene 3 (g) | 1194 | 1120 | 1120 | 1120 | 1120 | 1120 |
| Styrene 4 (g) | 1506 | 1412 | 1412 | 1412 | 1412 | 1412 |
| T(B)/T(E) (° C.) | 62/83 | 64/83 | 64/83 | 64/83 | 64/83 | 64/83 |
| Time (min) | 6 | 6 | 6 | 6 | 6 | 6 |
| Styrene 5 (g) | 756 | 1008 | 1008 | 1008 | — | — |
| T(B)/T(E) (° C.) | 70/78 | 70/76 | 70/76 | 70/76 | — | — |
| Time (min) | 14 | 14 | 14 | 14 | — | — |
| Mn (g/mol) | 116 000 | 118 000 | 117 000 | 118 000 | 87 000 | 71 000 |
| Mp (g/mol) | 155 000 | 156 000 | 159 000 | 155 000 | 154 000 | 155 000 |
| Mw (g/mol) | 175 000 | 176 000 | 181 000 | 177 000 | 159 000 | 145 000 |
| Tg (° C.) | −12/73 | −55/−13/75 | −70/−13/75 | −13/70 | −12/75 | −12/70 |
| Range (° C.) | 12/15 | 22/20/14 | 18/17/13 | 45/15 | 10/13 | 10/15 |
| MVI | 8.2 | 6.0 | 3.2 | 8.6 | 15 | 19 |

TABLE 2

Mechanical data

| (N/mm$^2$) | Example 1 | Example 2 | Example 3 | Example 4 | Example 5 | Example 6 |
|---|---|---|---|---|---|---|
| Yield stress | 1.5 | 1.5 | 1.4 | 1.2 | 1.3 | 1.9 |
| Breaking stress | 30.2 | 31.4 | 33.6 | 7.9 | 15.3 | 28.4 |

TABLE 2-continued

| (N/mm²) | | | | | | |
|---|---|---|---|---|---|---|
| Elongation at break (%) | 755 | 773 | 819 | 822 | 808 | 721 |
| Stress at 200% | 4.7 | 4.5 | 4.4 | 2.0 | 3.0 | 4.9 |
| Stress at 400% | 10.5 | 10.0 | 9.9 | 3.2 | 5.5 | 11.1 |
| Stress at 600% | 19.5 | 19.0 | 18.8 | 4.8 | 8.7 | 20.3 |

| (N/mm²) | Example 7 | Example 8 | Example 9 | Example 10 | Example 11 | Example 12 |
|---|---|---|---|---|---|---|
| Yield stress | 1.1 | 1.5 | 1.5 | 1.5 | 1.4 | 1.3 |
| Breaking stress | 16.8 | 30.1 | 29.9 | 31.6 | 22.4 | 17.7 |
| Elongation at break (%) | 560 | 781 | 801 | 782 | 776 | 675 |
| Stress at 200% | 4.2 | 4.3 | 4.1 | 4.4 | 3.5 | 3.3 |
| Stress at 400% | 9.5 | 9.5 | 9.2 | 9.8 | 7.6 | 7.2 |
| Stress at 600% | — | 18.3 | 18.1 | 19.1 | 15.5 | 14.8 |

| | Comparative experiments | | | |
|---|---|---|---|---|
| (N/mm²) | A | B | C | D |
| Yield stress | 24.5 | 17.6 | 32.1 | 0.6 |
| Breaking stress | 17.8 | 11.0 | 24.4 | 13.9 |
| Elongation at break (%) | 242 | 320 | 22 | 262 |
| Stress at 200% | 15.9 | 10.7 | — | 10.7 |
| Stress at 400% | — | — | — | — |
| Stress at 600% | — | — | — | — |

We claim:

1. An elastomeric block copolymer of
   i) from 15 to 65% by weight, based on the total block copolymer, of butadiene, and
   ii) from 35 to 85% by weight, based on the total block copolymer, of styrene, which block copolymer consists essentially of
      a) at least two blocks A which have polymerized units of styrene, a glass transition temperature Tg above 25° C. and form a rigid phase, and
      b) at least one elastomeric block which is composed of about 25 to 70% by weight of butadiene and 75 to 30% by weight of styrene, and which has polymerized B/A units of styrene and butadiene in a random structure, a glass transition temperature Tg from −50° C. to +25° C., and is located between two blocks A and forms a flexible phase, and the amount of the rigid phase accounts for 5 to 40% by volume.

2. The block copolymer of claim 1, wherein the Tg of the rigid phase is above 50° C. and Tg of the flexible phases is below 5° C.

3. The block copolymer of claim 1, which is obtained by anionic polymerization, wherein at least the polymerization of the flexible phase has been carried out in the presence of a polar cosolvent.

4. The block copolymer of claim 1, comprising a plurality of blocks B/A having different molecular weights per individual block B/A.

5. The block copolymer of claim 1, comprising a plurality of blocks A having different molecular weights per molecule.

6. The block copolymer of claim 1, which is represented by one or more of the formulae (1) to (11)

$$(A-B/A)_n; \quad (1)$$

$$(A-B/A)_n-A; \quad (2)$$

$$B/A-(A-B/A)_n; \quad (3)$$

$$X-[(A-B/A)_n]_{m+1}; \quad (4)$$

$$X-[(B/A-A)_n]_{m+1}; \quad (5)$$

$$X-[(A-B/A)_n-A]_{m+1}; \quad (6)$$

$$X-[(B/A-A)_n-B/A]_{m+1}; \quad (7)$$

$$Y-[(A-B/A)_n]_{m+1}; \quad (8)$$

$$Y-[(B/A-A)_n]_{m+1}; \quad (9)$$

$$Y-[(A-B/A)_n-A]_{m+1}; \quad (10)$$

$$Y-[(B/A-A)_n-B/A]_{m+1}; \quad (11)$$

where X is the radical of an (m+1)-functional initiator, Y is the radical of an (m+1)-functional coupling agent and m is a natural number from 1 to 10; n at formulas (1), (3), (4) and (8) is a natural number from 2 to 10; n at formulas (2), (5)–(7), and (9)–(11) is a natural number from 1 to 10.

7. The block copolymer of claim 6, which is represented by the formula A-B/A-A, X-[B/A-A]₂ or Y-[B/A-A]₂.

8. The block copolymer of claim 1, wherein the flexible phase B/A is divided into blocks $$(B/A)_1-(B/A)_2; \quad (12)$$

$$(B/A)_1-(B/A)_2-(B/A)_1; \quad (13)$$

or $$(B/A)_1-(B/A)_2-(B/A)_3, \quad (14)$$

the indices 1, 2, 3 indicating that the styrene/butadiene ratio in the individual blocks B/A is different or that the individual blocks B/A have different molecular weights, the glass transition temperature $T_g$ of each part-block being below 25° C.

9. A process for the preparation of an elastomeric block copolymer as defined in claim 1, which is carried out in a nonpolar solvent and wherein the preparation of the rigid block A is started and is continued to a conversion of more than 99% before the second monomer addition is carried out.

10. The process of claim 9, wherein a polar cosolvent is added to the nonpolar solvent in an amount of from 0.5 to 5% by volume during the preparation of block B/A.

11. A film, foam, thermoformed molding, injection molding or extruded section obtained from a molding material as defined in claim 1.

12. The block copolymer of claim 1, containing less than 50% by weight, based on the total block copolymer, of butadiene.

* * * * *